United States Patent [19]

Lee et al.

[11] Patent Number: 5,679,130
[45] Date of Patent: Oct. 21, 1997

[54] HYDROGEN OCCLUDED ALLOY AND PROCESS FOR PRODUCING SUCH

[75] Inventors: Kwang-Min Lee; Kyu-Nam Joo; Jong-Seo Choi; Geun-Bae Kim; Kwi-Seuk Choi; Sang-Won Lee, all of Suwon, Rep. of Korea

[73] Assignee: Samsung Display Devices Co., Ltd., Kyungki-do, Rep. of Korea

[21] Appl. No.: 569,705

[22] Filed: Dec. 8, 1995

[30]    Foreign Application Priority Data

Dec. 28, 1994 [KR] Rep. of Korea ............... 94-38129

[51] Int. Cl.$^6$ ............................................. B22F 9/04
[52] U.S. Cl. ................... 75/352; 75/354; 75/357; 75/360; 241/23; 420/900
[58] Field of Search ................. 75/352, 354, 357, 75/360; 241/17, 23; 420/900

[56]    References Cited

U.S. PATENT DOCUMENTS 4,893,756  1/1990  Fetchenko et al. .................. 241/1
5,096,665  3/1992  Fujitani et al. .................... 420/900

FOREIGN PATENT DOCUMENTS 510918  10/1992  European Pat. Off. .............. 75/352

*Primary Examiner*—George Wyszomierski
*Attorney, Agent, or Firm*—Lowe, Price, LeBlanc & Becker

[57]    ABSTRACT

A hydrogen occluded alloy and a process for producing the above alloy are disclosed. The above process mechanically forms the hydrogen occluded alloy having improved initial discharging characteristics. In the above process, either a powdered LaNi$_5$ alloy or rare earth metals, such as la, Ce, Pr and Nd, and a powdered CaCu$_5$ alloy of Mm-Mn-Ni-Al-Co alloys is mixed with a powdered Laves alloy of Zr-Mn-V-Cr-Ni alloys into a powdered alloy mixture. Thereafter, the alloy mixture is applied with a mechanical impact by a high energy ball mill with an attritor, thereby mechanically forming the hydrogen occluded alloy. The above process easily controls the manganese component while producing the hydrogen occluded alloy through the mechanical alloying.

6 Claims, 1 Drawing Sheet

HYDROGEN OCCLUDED ALLOY AND PROCESS FOR PRODUCING SUCH

BACKGROUND OF THE INVENTION

1. Field of the Invention

The present invention relates in general to a hydrogen occluded alloy used as a material of cathodes of nickel-hydrogen secondary cells and, more particularly, to a hydrogen occluded alloy and a process for producing such alloy suitable for improving the initial discharging characteristics of the cathodes.

2. Description of the Prior Art

The nickel-cadmium cells (Ni-Cd cells) have been typically used as alkaline secondary cells. However, the above Ni-Cd cells are problematic in that they cause serious environmental pollution due the cadmium. In order to substitute for the above Ni-Cd cells, Ni-H cells using hydrogen occluded alloy as their cathodes have been actively studied. The above hydrogen occluded alloy used as the cathodes is expected to provide a high capacity of secondary cells. However, the known hydrogen occluded alloy used as the cathodes of the Ni-H cells is still problematic in that the alloy fails to improve the initial discharging capacity of the cells or to extend the expected cyclic life span of the cells.

The known hydrogen occluded alloys used as the Ni-H cell's cathodes are typically produced by a paste process. However, the hydrogen occluded alloys produced by the paste process have the following problems. That is, the $CaCu_5$ alloys such as the $LaNi_5$ alloys have the problem of a low hydrogen gas occlusion ratio, while the Laves phase alloys or the $AB_2$ alloys have a problem in their initial cyclic characteristics. In order to rectify the above problems, either an arc melting process or a high temperature sintering process may be used for producing the hydrogen occluded alloys. However, both the arc melting process and the high temperature sintering process still cause a problem in uniformity of alloy as well as in composition of alloy components while producing the hydrogen occluded alloys. This is because the rare earth metals, La and Ce, of $CaCu_5$ alloys are low melting point metals. That is, the low melting point metals, La and Ce, are melted earlier than the high melting point metals while the metals are alloyed by either the arc melting process or the high temperature sintering process. Therefore, both the arc melting process and the high temperature sintering process cause vaporization of the low melting point metals and segregation of the resulting alloys.

SUMMARY OF THE INVENTION

It is, therefore, an object of the present invention to provide a process for producing a hydrogen occluded alloy in which the above problems can be overcome and which mechanically forms the hydrogen occluded alloy having improved initial discharging characteristics. In the above process, either an $LaNi_5$ alloy or a $CaCu_5$ alloy of Mm-Mn-Ni-Al-Co alloys is mixed with a Laves alloy of Zr-Mn-V-Cr-Ni alloys into a powdered alloy mixture prior to applying a mechanical impact to the powdered alloy mixture using a high energy ball mill with an attritor, thereby mechanically forming the hydrogen occluded alloy. The above process easily controls the manganese component while mechanically alloying.

It is another object of the present invention to provide a hydrogen occluded alloy produced by the above process.

In order to accomplish the above objects, the present invention provides a process for producing a hydrogen occluded alloy comprising the steps of mixing a powdered Laves alloy of Zr-Mn-V-Cr-Ni alloys with either a powdered $LaNi_5$ alloy or rare earth metals, such as la, Ce, Pr and Nd, and a powdered $CaCu_5$ alloy of Mm-Mn-Ni-Al-Co alloys, thereby forming a powdered alloy mixture; applying a mechanical impact to the powdered alloy mixture through high energyball milling using a ball mill with an attritor, thereby mechanically alloying the powdered alloy mixture into alloy powder; removing residual gases from the alloy powder; and testing the hydrogen occlusion characteristics of the alloy powder.

BRIEF DESCRIPTION OF THE DRAWINGS

The above and other objects, features and other advantages of the present invention will be more clearly understood from the following detailed description taken in conjunction with the accompanying drawing, in which.

DESCRIPTION OF THE PREFERRED EMBODIMENTS

Figure 1:
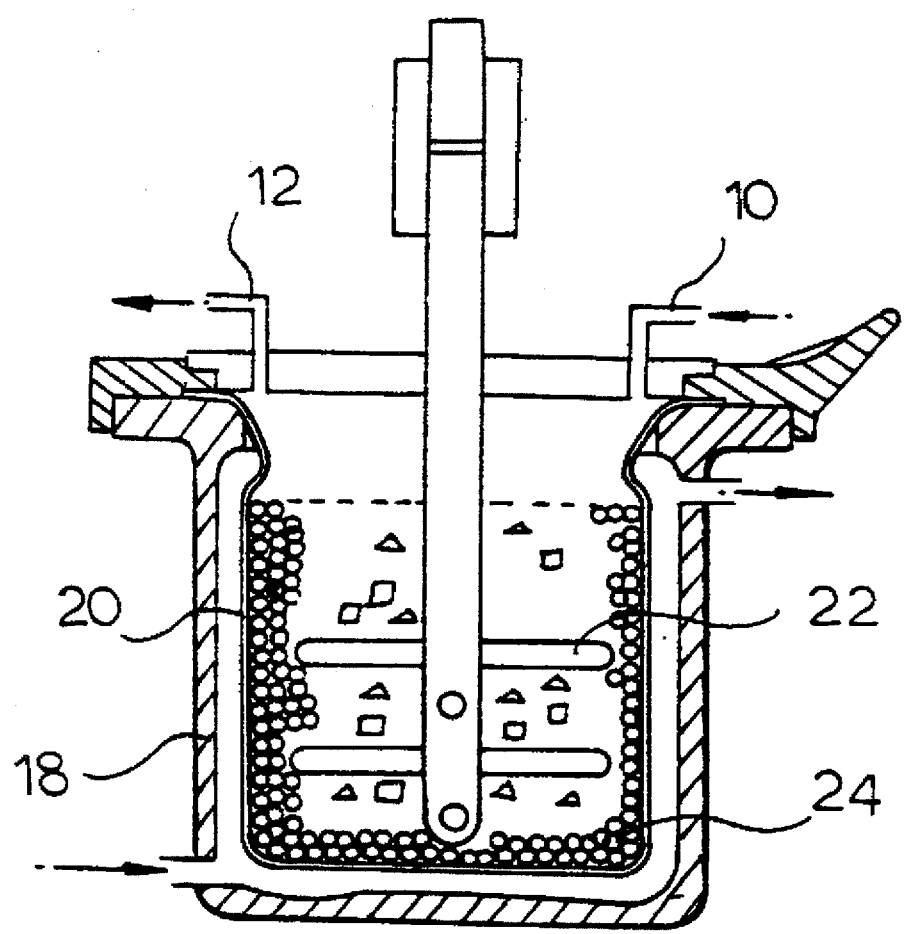
FIG. 1 is a sectional view showing the construction of a mechanical alloying device for producing a hydrogen occluded alloy in accordance with the present invention.

FIG. 1 is a sectional view showing the construction of a mechanical alloying device for producing a hydrogen occluded alloy in accordance with the present invention.

In a process for producing the hydrogen occluded alloy of this invention, 90–99 wt % of powdered Laves alloy of Zr-Mn-V-Cr-Ni alloys is mixed with 1–10 wt % of either powdered $LaNi_5$ alloy or powdered $CaCu_5$ alloy of Mm-Mn-Ni-Al-Co alloys, thereby forming a powdered alloy mixture in the 1st step.

Thereafter, the Laves alloy of Zr-Mn-V-Cr-Ni alloys and either the $LaNi_5$ alloy or the $CaCu_5$ alloy of Mm-Mn-Ni-Al-Co alloys are mechanically alloyed. The above mechanical alloying step may be performed by high energy ball milling using a ball mill with an attritor.

Please note that either an attritor vibration mill or a shaker mill may be used in the above high energy ball milling.

In the high energy ball milling, the ball mill is operated at a relatively higher rotating speed of 300–700 rpm for 1–500 hours. 1–5 wt % of either stearic acid or methanol is used as a process controlling agent. The weight ratio of the balls to the powdered alloy mixture is 50:1–150:1.

As shown in FIG. 1, the powdered alloy mixture coming out of the 1st step is put into a pulverizing cylinder 20 prior to rotating the rods 22 inside the cylinder 20. The rods 22 are initially rotated by handling an operating switch (not shown). As a result of the rotating motion of the rods 22, a plurality of balls 24 contained in the cylinder 20 collide with each other while cascading and rotating in the cylinder 20. Therefore, the powdered alloy mixture, including the Laves alloy of Zr-Mn-V-Cr-Ni alloys and either the $LaNi_5$ alloy or the $CaCu_5$ alloy of Mm-Mn-Ni-Al-Co alloys, in the cylinder 20 is applied with a large mechanical impact by the balls 24, thereby being formed into a new alloy. In the above mechanical alloying step, the temperature inside the cylinder 20 rises due to the mechanical impact of the balls 24.

The rising temperature inside the cylinder 20 is reduced by the cooling water flowing in a cooling chamber defined between the cylinder 20 and a cooling case 18 surrounding the cylinder 20. In this case, the cooling water flows into the chamber at the bottom side of the case 18 and flows out of the chamber at the top side of the case 18. The flowing direction of the cooling water is shown by the arrows in FIG. 2.

The above new alloy formed by the above mechanical alloying step in turn is heated to 350°–600° C. in a vacuum. Therefore, the residual gases such as $H_2O$, $O_2$ and $(OH)_2$ of the alloy are exhausted through a gas exhaust port 12 of the device.

After removing the residual gases from the alloy, the initial discharging characteristics, the hydrogen occlusion characteristics and the hydrogen discharging characteristics of the resulting alloy are tested prior to checking the operational performance of the hydrogen occluded alloy.

In the above process, both a forming step and a heat treating step may be performed after the residual gas removing step. The above forming step is for forming the alloy free from the residual gases into an alloy pellet, while the above heat treating step is for uniforming the quality of the pellet's alloy. In the heat treating step, the alloy pellet is heated at 500°–700° C. in either an inert atmosphere or a vacuum.

In the above process for producing the hydrogen occluded alloy, the Laves alloys are used as a basic metal so as to not only improve both the discharging characteristics and the hydrogen gas occlusion characteristics, but also to overcome the problems caused by the cyclic initial characteristics. The alloy of this invention thus improves the discharging capacity of the cathode. In the above process, the raw alloy or the powdered $CaCu_5$ alloy having an intrinsic problem in its gas occlusion characteristics are mechanically alloyed. The powdered raw alloy is thus uniformly distributed in the Laves alloy or the basic metal. In this regard, the process of this invention produces an excellent hydrogen occluded alloy having the advantages of both the Laves alloy and the $CaCu_5$ alloy.

The above mechanical alloying step is a solid phase reaction step. The process of this invention thus easily alloys the low melting point rare earth metals, such as La and Ce which are the alloy elements of the $CaCu_5$ alloys. The above process also prevents manganese, or the alloy element of Laves alloys, from vaporing out or changing into different species, thereby easily controlling the manganese component while mechanically alloying.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A process for producing a hydrogen occluded alloy comprising the steps of:

mixing a powdered Zr-Mn-V-Cr-Ni alloy having a Laves phase with one of a powdered Mm-Mn-Ni-Al-Co alloy having a $LaNi_5$ phase, a powdered Mm-Mn-Ni-Al-Co alloy having a rare earth metal phase, and a powdered Mm-Mn-Ni-Al-Co alloy having a $CaCu_3$ phase, thereby forming a powdered alloy mixture;

applying a mechanical impact to said powdered alloy mixture through high energy ball milling using a ball mill with an attritor, thereby mechanically alloying the powdered alloy mixture into alloy powder;

removing residual gases from said alloy powder; and determining the hydrogen occlusion capacity of said alloy powder.

2. The process according to claim 1, wherein the step of applying a mechanical impact is performed using one of an attritor vibration mill and a shaker mill.

3. The process according to claim 1, wherein said high energy ball milling is performed under the conditions of a ball mill rotating speed of 300–700 rpm, a processing time of 1–500 hours, using one of stearic acid and methanol as a process controlling agent and using milling balls having a weight ratio of the milling balls to the powdered alloy mixture of 50:1–150:1.

4. The process according to claim 1, wherein the step following the residual gas removing step also includes both a step of forming a pellet out of said alloy powder and a heat treating step of heating said pellet at 500°–700° C. in one of an inert atmosphere and a vacuum.

5. The process according to claim 1, wherein said mixing step comprises mixing the Zr-Mn-V-Cr-Ni alloy having a Laves phase in an amount of 90–99 wt %, with a Mm-Mn-Ni-Al-Co alloy having a $LaNi_5$ phase or with a Mm-Mn-Ni-Al-Co alloy having a $CaCu_3$ phase in an amount of 1–10 wt %.

6. The process according to claim 1, wherein the rare earth metal phase comprises at least one of La, Ce, Pr and Nd.

* * * * *